(12) United States Patent
Trudeau et al.

(10) Patent No.: US 6,832,143 B2
(45) Date of Patent: Dec. 14, 2004

(54) DRIVE TRAIN VIBRATION CONTROL SYSTEM

(75) Inventors: Curtis A. Trudeau, Caledonia, MI (US); Robert D. Sorum, Caledonia, MI (US)

(73) Assignee: Hadley Products, Grandville, MI (US)

( * ) Notice: Subject to any disclaimer, the term of this patent is extended or adjusted under 35 U.S.C. 154(b) by 0 days.

(21) Appl. No.: 10/207,949

(22) Filed: Jul. 30, 2002

(65) Prior Publication Data

US 2003/0023357 A1 Jan. 30, 2003

Related U.S. Application Data

(60) Provisional application No. 60/308,695, filed on Jul. 30, 2001.

(51) Int. Cl.[7] ................................................ G06F 7/00
(52) U.S. Cl. ........................ 701/37; 701/87; 701/111; 280/5.5; 280/5.504; 280/6.157
(58) Field of Search .............................. 280/5.5, 5.504, 280/5.507, 6.151, 6.157; 701/37, 85, 87, 102, 103, 104, 111

(56) References Cited

U.S. PATENT DOCUMENTS

| | | | |
|---|---|---|---|
| 5,189,621 A | * | 2/1993 | Onari et al. ................. 701/102 |
| 5,273,308 A | * | 12/1993 | Griffiths ................... 280/6.151 |
| 5,335,695 A | * | 8/1994 | Pierce ...................... 137/627.5 |
| 5,448,976 A | | 9/1995 | Treinies et al. |
| 5,759,133 A | | 6/1998 | Treinies et al. |
| 5,785,345 A | | 7/1998 | Barlas et al. |
| 5,955,674 A | | 9/1999 | McGovern et al. |
| 5,994,859 A | | 11/1999 | Deng et al. |
| 6,072,297 A | | 6/2000 | Xu et al. |
| 6,128,959 A | | 10/2000 | McGovern et al. |
| 6,138,629 A | | 10/2000 | Masberg et al. |
| 6,431,557 B1 | | 8/2002 | Terborn et al. |

* cited by examiner

*Primary Examiner*—Gertrude A. Jeanglaude
(74) *Attorney, Agent, or Firm*—Warner Norcross & Judd LLP

(57) ABSTRACT

A control system that senses misalignment of components in a vehicle drive train system and adjusts the vehicle ride height to realign the components. A control unit monitors vibration, torque or other operating parameters of a vehicle's drive train or other vehicle components and determines whether the parameters are abnormal. If the monitored parameters are abnormal, then the control unit controls suspension elements on the vehicle to adjust the ride height of the vehicle and subsequently the alignment of the drive train, for example, the operating angle of the driveshaft. A ride height sensor feeds back ride height measurements as the suspension elements are adjusted to assist in finding an optimal ride height that eliminates or reduces excess vibration and/or torque. In another embodiment, the control unit adjusts the ride height based on vehicle speed or fuel economy to reduce the profile of the vehicle and improve fuel economy.

26 Claims, 4 Drawing Sheets

DRIVE TRAIN VIBRATION CONTROL SYSTEM

This non-provisional application claims priority from U.S. Provisional Application No. 60/308,695, filed Jul. 30, 2001, and titled "Vehicle Drive Train Vibration Control System and Related Method."

BACKGROUND

The present invention relates to drive trains for vehicles and, more particularly to systems that reduce vibration in drive trains.

Most conventional vehicles are equipped with a drive train that transfers power and torque from an engine to wheels or tracks to propel the vehicle along a surface. Drive trains typically include an engine, a transmission, a driveshaft and an axle. The transmission provides sufficient gearing to propel the vehicle at desired speeds when power and torque are transferred from an engine to the transmission. The driveshaft connects the transmission to the axle to transfer power and torque from the transmission to the axle and subsequently to the wheels or tracks of the vehicle.

Many automotive manufacturers provide warranties that cover excessive wear or damage to drive train components under normal operating conditions. This is particularly true in the semi-truck manufacturing industry. Such warranties typically cover the various components of the drive train. Thus, it is an objective of the manufacturers to lengthen the life of the drive train to reduce costs associated with repairs done under warranty.

A significant cause of drive train damage and excessive wear is vibration. Vibration frequently is the result of drive train components being mis-aligned in operation. For example, the transmission and axle typically are positioned relative to one another so that the drive shaft rotates and communicates power and torque between the two at a prescribed design angle (or range of angles) to horizontal. When a vehicle is fully loaded, for example, when a semi-truck is loaded with a heavy trailer, the vehicle's suspension compresses and the ride height of the vehicle (i.e., the height of the frame relative to some fixed point on the vehicle) changes. Consequently, the drive train components, which are secured to the frame, move relative to one another so that the angle of the driveshaft changes with respect to the prescribed design angle. In this condition, the driveshaft and other drive train components are misaligned and thus have a tendency to vibrate in operation. This vibration typically increases with higher vehicle speeds.

With increased vibration, the drive train components undergo excessive wear, and in some cases the components catastrophically fail. Such wear and failure is very costly. One attempt to reduce drive train vibration is implemented via a mechanical height control that measures the ride height of the vehicle. If the ride height changes when the vehicle is loaded, then the mechanical height-control returns the ride height to a pre-set, factory ride height by adjusting the suspension elements of the vehicle. Nonetheless, excessive vibration still may exist in the drive train due to the load in combination with other factors, such as engine torque, tire size and pressure, vehicle frame deflection, frame rake (i.e., the angle of the frame from the front of the vehicle to the back) and wind. Thus, even with mechanical ride height controls, drive trains still may be subject to costly repair and down time due to wear and damage caused by vibration.

SUMMARY OF THE INVENTION

The aforementioned problems are overcome in the present invention in which a control system senses vibration in a vehicle drive train and adjusts the ride height of the vehicle to reduce or eliminate the vibration. Preferably, the ride height is adjusted so that the drive train components are aligned within optional parameters to reduce or eliminate vibration.

In a preferred embodiment, the control system includes a control unit, a sensor and a module that adjusts the vehicle's suspension and, thus, the vehicle's ride height. The sensor measures vibration or torque, for example, transmission vibration or engine torque. The sensor may be a stand-alone sensor, or the control unit may communicate directly with the vehicle's data communication bus to derive the vibration, torque and/or other information. The measurements of the sensor are relayed to the control unit, which determines if the measurements are abnormal. If the measurements are abnormal, the control unit activates the module to adjust the suspension so that the ride height of the vehicle changes. By adjusting the ride height of the vehicle, the angular relation of the drive train components, for example, the axle, the driveshaft and the transmission are realigned to effectively reduce or eliminate the abnormal vibration and/or torque.

In a more preferred embodiment, the module is a valve and the suspension includes air ride suspension elements. When the control unit determines abnormal vibration and/or undesirable torque variation (UTV), it opens and/or closes the valve to inflate or deflate the suspension elements and, thus raise and/or lower the ride height of the vehicle. Optionally, a height sensor feeds back height information to the control unit to monitor the adjustment of the ride height of the vehicle and more efficiently reduce excessive vibration and/or UTV. Further optionally, the control unit continues to monitor vibration and repeatedly adjust ride height until excessive vibration and/or UTV is reduced or eliminated.

In another embodiment, the control unit adjusts the ride height of the vehicle based on the speed of the vehicle. For example, when cruising speeds are detected, the control unit lowers the vehicle ride height via the module to reduce the vehicle's profile and improve fuel economy. The control unit does this while monitoring vibration and/or torque to prevent an excess of either from developing.

These and other objects, advantages and features of the invention will be more readily understood and appreciated by reference to the detailed description of the invention and the drawings.

DETAILED DESCRIPTION OF THE INVENTION

I. Overview

Figure 1:
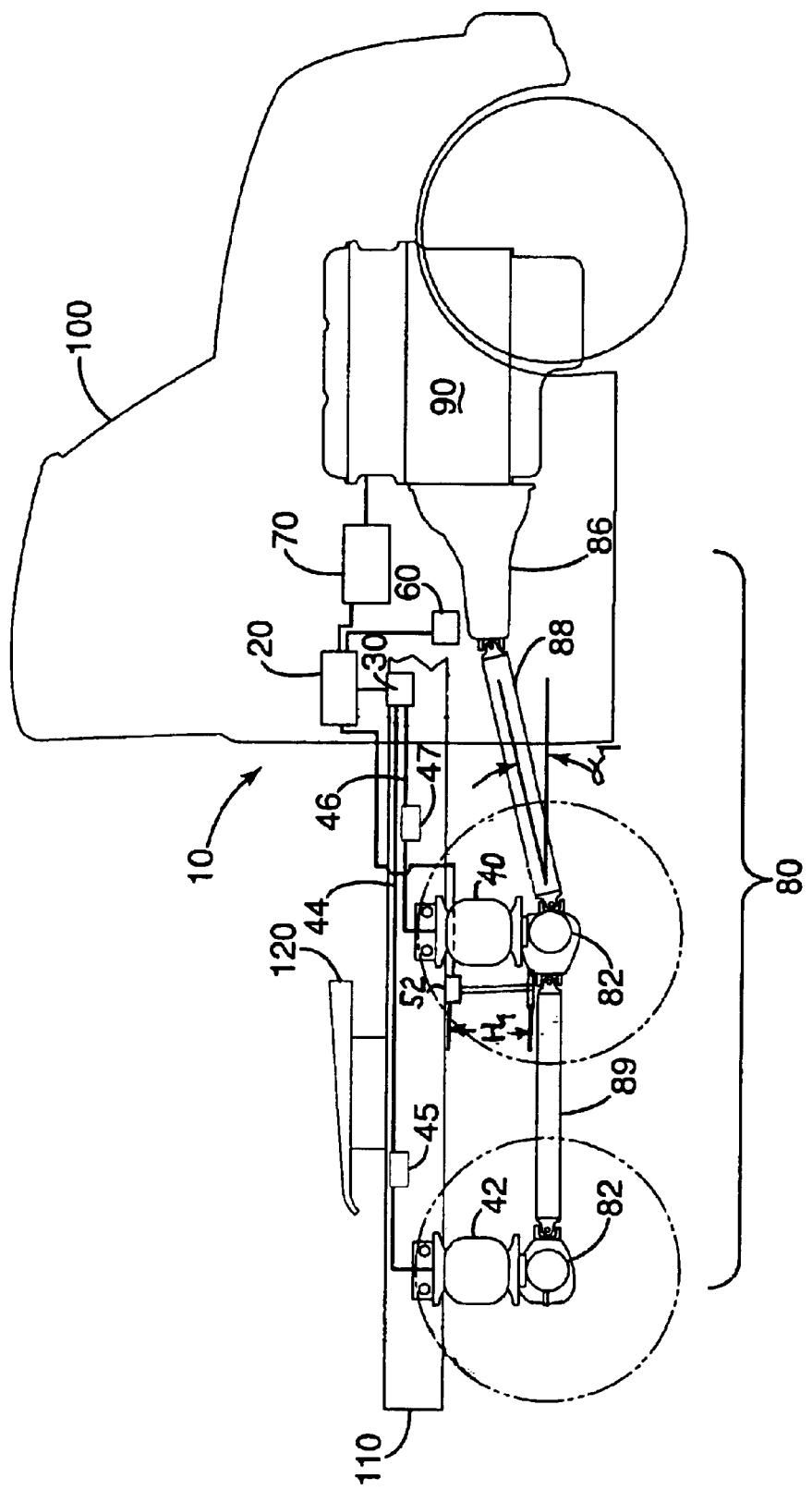
FIG. 1 is a side elevational view of a vehicle including the control system of the present invention.

A control system in accordance with a first embodiment of the invention is illustrated in FIG. 1 and generally designated 10. As shown, the control system 10 is implemented in a semi-truck 100. The control system 10 generally includes control unit 20, a valve module 30, which is in communication with suspension elements 40 and 42, and a height sensor(s) 52. The control unit is further in communication with a sensor 60 and/or a vehicle data communications module or bus 70, which is provided by the manufacturer to monitor vehicle operating parameters, such as power-train or drive-train torque, horsepower, harmonic oscillation, engine revolutions-per-minute (rpms), vehicle velocity, vehicle acceleration and the like.

In operation, the control unit 20 receives vibration measurements from the sensor 60 and/or vibration or torque measurements from the vehicle data communications module 70. These measurements are compared to stored vibration and/or torque data to determine if excessive vibration or torque is present in the vehicle drive train. The drive train generally refers to any mechanism that transfers power from the engine to the wheels, including the transmission 86, the driveshaft 88 and the axle(s) 82. If the control unit 20 determines that abnormal vibration and/or torque is present in the drive train, then the control unit 20 controls valve module 30, which in turn inflates or deflates the suspension elements 40 and 42. This adjusts the ride height $H_1$ until the vibration and/or torque is reduced or eliminated or brought within acceptable tolerances. This acceptable condition frequently occurs when the angle of the driveshaft $\alpha_1$ relative to horizontal corresponds to a prescribed design angle or falls within a range of acceptable design angles $\alpha_1$.

Although the control system as shown is implemented in a semi-truck, it may be used with any type of vehicle, for example, a bus, a passenger vehicle, an agricultural tractor, a tracked machine and the like. Moreover, the control system may be used with front-wheel drive, all-wheel drive and select-wheel drive vehicles as well as the rear-wheel drive semi-truck as shown. Further, the system 10 may be used to adjust the ride height of the vehicle relative to non-driven wheels as well as driven wheels to reduce or eliminate vibration and/or torque exerted on the drive train or other components of the vehicle.

II. Control System Construction

Figure 2:
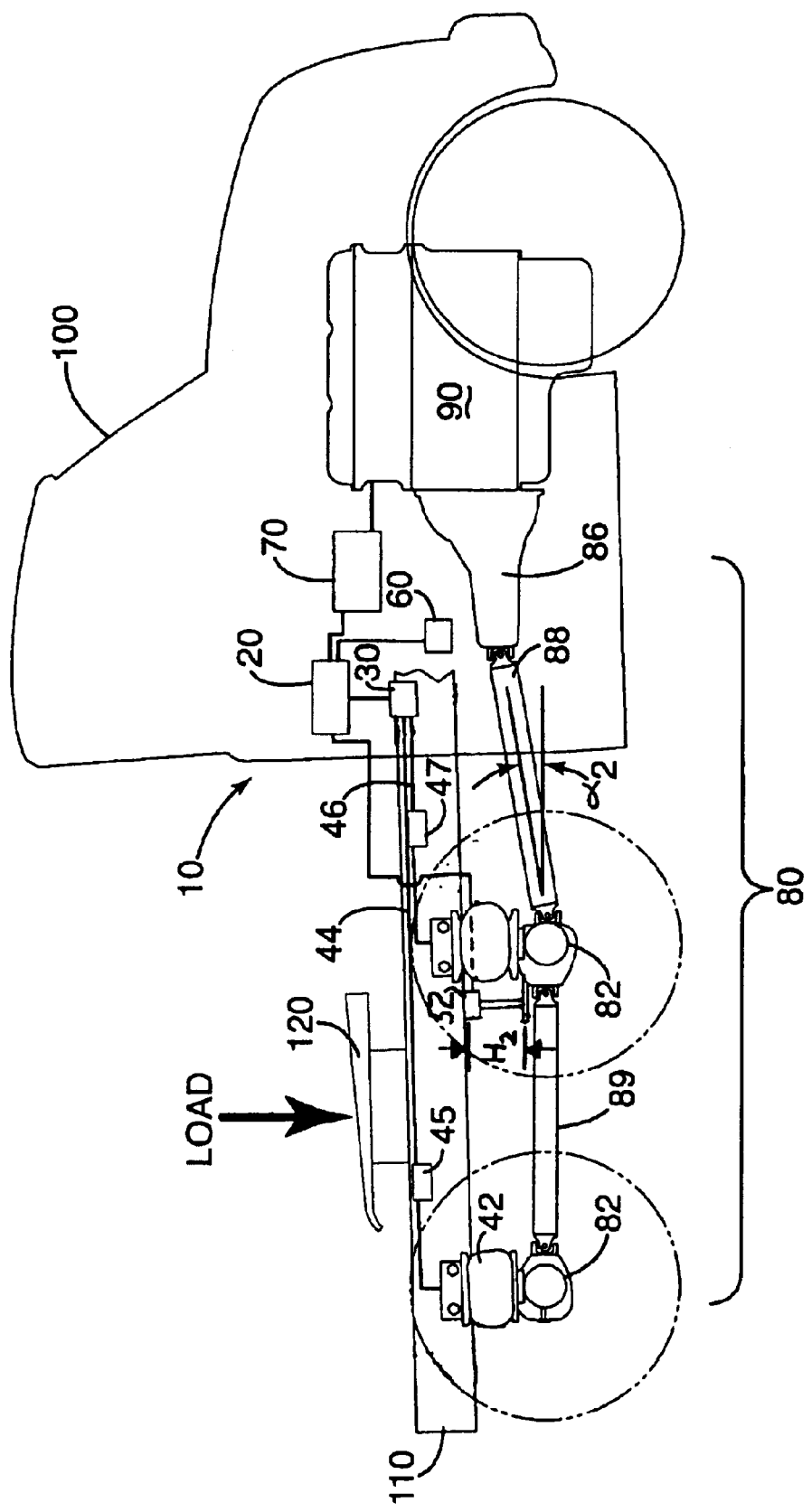
FIG. 2 is a side elevational view of the vehicle under a load.
Figure 3:
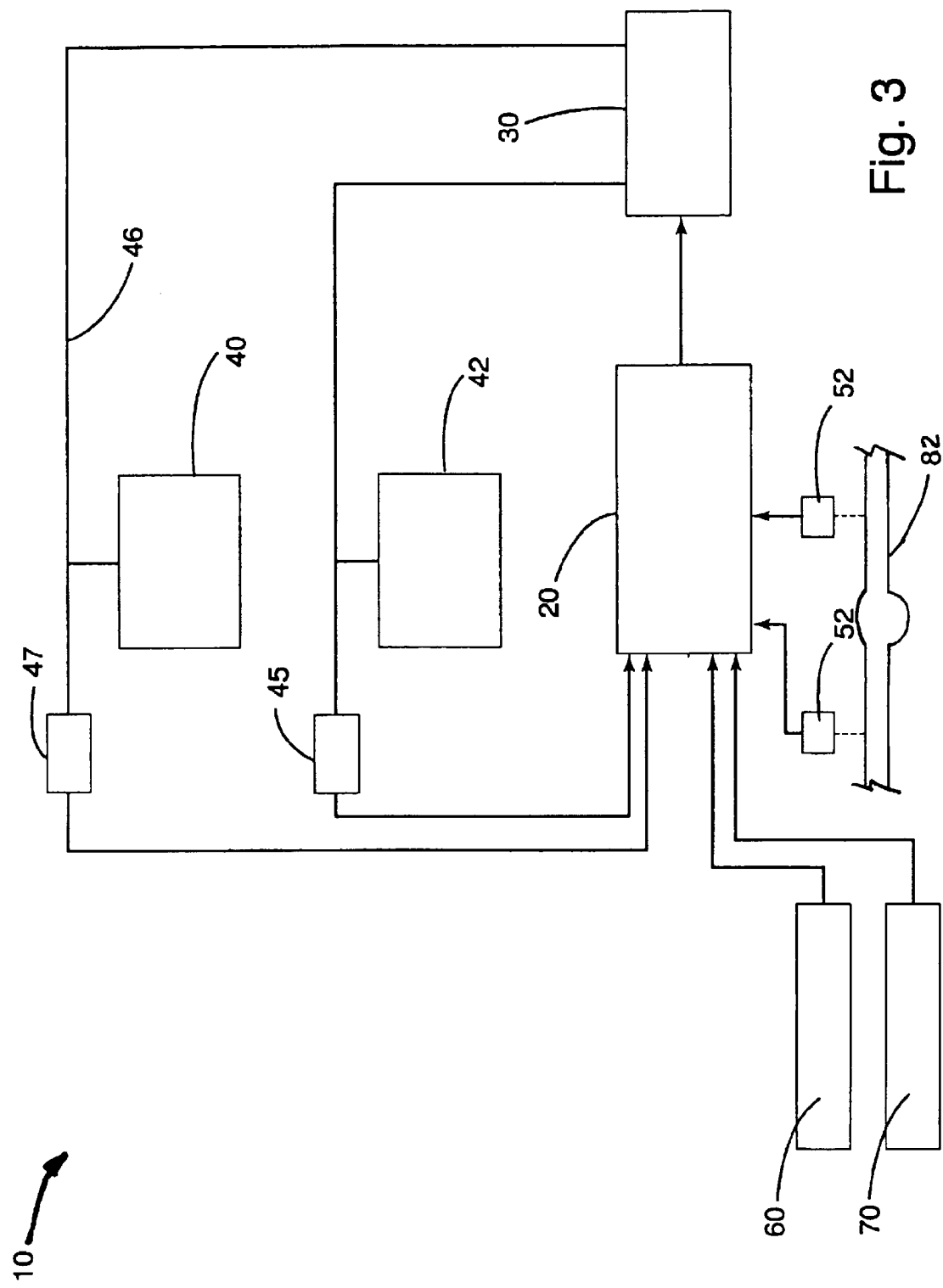
FIG. 3 is a schematic diagram of the control system of the present invention.

The control system 10 as shown in the semi-truck 100 of FIGS. 1–2 and schematically in FIG. 3, includes control unit 20, which controls valve module 30, which is further in communication with suspension elements 40 and 42 via airlines 44 and 46. Control unit 20 is further in communication with a sensor 60, which senses vibrations in the transmission 86 of the semi-truck 100. Optionally, the control unit 20 also may be communication with the vehicle data communication module 70, which monitors operating parameters of the semi-truck 100, including torque, horsepower, harmonic oscillations, and rpms output by the engine 90, transmission 86 and other components of the vehicle, as well as velocity, acceleration and the like. The control unit 20 optionally may be in communication with the height sensor(s) 52 to detect changes in height of the truck frame 110 relative to the axles 82 or some other component of the vehicle or the ground.

The control unit 20 preferably includes a processor adapted to process input from any of the various components of the control system 10 and create output to control the valve module 30. For example, the control unit can obtain vibration measurements from the sensor 60 in the transmission, process them, and output control instructions to the valve module 30 to inflate or deflate the suspension elements 40 and 42 and subsequently to alter the ride height $H_1$ of the semi-truck 100. The control unit 20 optionally includes a memory in which to store various combinations of loads, operating velocities and the corresponding ride height at which the vehicle may be operated to minimize vibration. The memory may be structured in the form of tables, in which a missing parameter, such as ride height may be determined based on input, such as vehicle speed and/or load. Further, the control unit includes a learning capacity wherein it can repeatedly determine the ride height to which the vehicle must be adjusted to minimize excessive vibration and undesirable torque variation (UTV), and subsequently store the parameters. With the stored parameters, an optimal ride height adjustment is recallable when similar input parameters are detected by the control unit 20.

Optionally, in embodiments where the control unit 20 is connected to the vehicle communications module 70, the unit 20 can also or alternatively take measurements obtained by the module 70, process them and control the valve module accordingly. For example, the control unit 20 processes vibration, torque, horsepower, harmonic oscillations, engine rpms, vehicle velocity and acceleration measurements from the module 70 to realign the drive train 80. The control unit 20 also may process vehicle speed measurements of the module 70 and subsequently adjust the ride height $H_1$ of the vehicle to enhance fuel economy while ensuring vibration is not created within the drive train by adjusting the ride height.

The valve module 30 preferably is in fluid communication with an air supply (not shown) and the suspension elements 40 and 42 via air lines 44 and 46. Although not shown, another set of suspension elements identical to those shown in FIGS. 1 and 2, may be positioned on the other side of the semi-truck. The valve module 30 regulates the amount of air supplied to or exhausted from the suspension elements. The valve module preferably is an electric solenoid valve, but any other actuateable valve may be used. Optionally, the air lines 44 and 46 and/or the suspension elements 40 and 42 are monitored with pressure sensors 45 and 47. The pressure sensors 45 and 47 may be in communication with the control unit 20 so the control unit can monitor suspension elements 40 and 42 and ensure that they are at the proper pressure for satisfactory drive train alignment.

The suspension elements 40 and 42, when operated by the valve module 30 are adapted to either push the axles away from the frame 110 when the suspension elements are inflated or allow the axles to come closer to the frame when deflated. This activity is also associated with the increase and decrease of the ride height $H_1$ which generally refers to the distance between a reference point associated with the axles 82 and a reference point associated with the frame 110 of the semi-truck 100. As will be appreciated, other reference points may be used to establish the ride height of the semi-truck 100.

The control unit 20 is also in communication with sensor 60. The sensor 60 as shown is mounted to or adjacent the transmission 86 and adapted to monitor vibration within the transmission which may be transmitted through the driveshaft 88 or other components of the drive train 80. Although shown mounted on the transmission 86, the sensor 60 may be mounted to the engine 90, the frame 110, the axles 82 or any other component of the semi-truck 100 to measure vibration in those components. In one embodiment, the sensor 60 is an accelerometer adapted to measure accelerated (or shock) along the 3 axes of the sensor. The sensor may measure the general vibration experienced by the transmission. The sensor 60 may also measure specific characteristics of the vibration, for example, frequency, amplitude and impulses of vibration and feed this information back to the control unit to adjust the suspension elements.

Optionally, the control unit 20 is in communication with the vehicle data communications module or bus 70. The bus 70 preferably is a standard bus provided by the semi-truck manufacturer. More preferably, the bus monitors multiple operating parameters (e.g., torque, horsepower, harmonic oscillations, rpms) of the engine 90, the transmission 86 and other components of the vehicle, as well as vehicle speed and acceleration. The control unit 20 optionally processes the information measured by the bus 70 to control the valve module 30 and adjust the ride height $H_1$ based on the measured information. In such a situation, the sensor 60 may be absent, and the system 10 may rely solely on the information measured by the bus 70 to adjust the ride height $H_1$ based on the measured information. For example, if the torque measured by the bus 70 in the transmission 86 or the engine 90 indicates an improper strain on those components or the drive train 80 in general, the control unit processes this information to determine that the driveshaft is operating at an angle $\alpha_1$ other than the design angle or outside a preferred range of angles. Accordingly, the control unit 20 operates the valve module 30 to realign the drive train as discussed in further detail below.

The system 10 may also include one or more height sensor(s) 52 that provide ride height information to the control unit 20. For example, after adjusting the ride height $H_1$, the control unit 20 receives new height data from the height sensor(s) 52. This data may be used to confirm that the ride height $H_1$ was properly adjusted, or to determine that further ride height adjustment is required, or to confirm that the ride height is within normal operating parameter, for example, at a prescribed ride height. This prescribed ride height may be set by the manufacturer or the dealer and associated with an ideal ride height. Additionally, the control unit 20 may store the sensed ride height information to establish a data log of variations in the ride height. This ride height information may subsequently be used to determine whether or not to replace the drive train components under warranty. As shown in FIG. 1, the ride height sensor 52 generally includes two sensors that measure the ride height of axle 82. As shown in FIG. 3, one of the two sensors is on the curb side of the truck and the other is on the driver side of the truck. The sensors 52 use geometry extrapolate the ride height $H_1$ Additional or other ride height sensors may be positioned elsewhere on the semi-truck 100, for example, adjacent the front axles (not shown) to measure ride height, or even determine frame rake.

The measured drive angles and extrapolated ride heights may be supplied to the control unit 20 to adjust the ride height until a pre-set or acceptable drive angle is detected. This adjustment may be done independently or concurrently with the measurement of vibration and/or torque to ensure that the vibration and/or torque is acceptable.

III. Control System Operation

In general, the control system 10 illustrated in FIGS. 1–3 monitors vibration, torque or other operating parameters of the semi-truck 100, and adjusts the right height of the vehicle to realign the components of the drive train 80. Such alignment reduces excessive vibration and UTV and optionally lowers the vehicle within acceptable tolerances to improve fuel economy.

Specifically, when out of tolerance operating parameters are detected, the control unit 20 adjusts the suspension elements 40 and 42, thereby changing ride height $H_1$, and subsequently the angle $\alpha_1$ of the driveshaft 88. Referring to FIG. 2, when a load is placed on the fifth wheel 120, the load compresses the suspension elements 40 and 42, pushing the frame 110 closer to the axles 82. In turn, the ride height $H_1$ in FIG. 1 changes to $H_2$ in FIG. 2. Likewise, the angle $\alpha_1$ of the driveshaft 88 in FIG. 1 changes to $\alpha_2$ in FIG. 2.

If the semi-truck 100 travels with the load as shown in FIG. 2, and the driveshaft angle $\alpha_2$ is outside a prescribed design angle or range of angles, then the driveshaft 88 and/or other components of the drive train 80 typically begin to vibrate. In some cases, this vibration becomes excessive, to the point it may damage the components of the drive train 80.

As the semi-truck 100 moves at travelling speeds, the sensor 60 measures vibration (and/or the bus 70 measures torque and other operating parameters) and communicates these measurements to the control unit 20. If the vibration is determined excessive by the control unit 20, the control unit adjusts the ride height $H_2$ by adjusting the suspension elements 40 and 42 via the valve module 30 so that the angle $\alpha_2$ is reset within to an acceptable angle or within an acceptable range of angles to eliminate vibration in the drive train 80 or at least reduce the vibration to within acceptable limits. The control unit 20 may perform this task in several specific ways discussed below.

A. Automatic Reset Mode

When in the automatic reset mode, the control unit senses excessive vibration from the sensor 60 and the drive train 80, or optionally, UTV and/or vibration through the bus 70. The control unit 20 measures ride height from the sensors 52 to determine whether or not the sensor detects an acceptable drive angle $\alpha_1$ or range of angles. If the acceptable drive angle $\alpha_1$ is not sensed, the control unit 20 operates the valve module 30 to inflate or deflate the suspension elements 40 and 42 until an acceptable driveshaft angle $\alpha_1$ is detected.

B. Searching Mode

Figure 4:
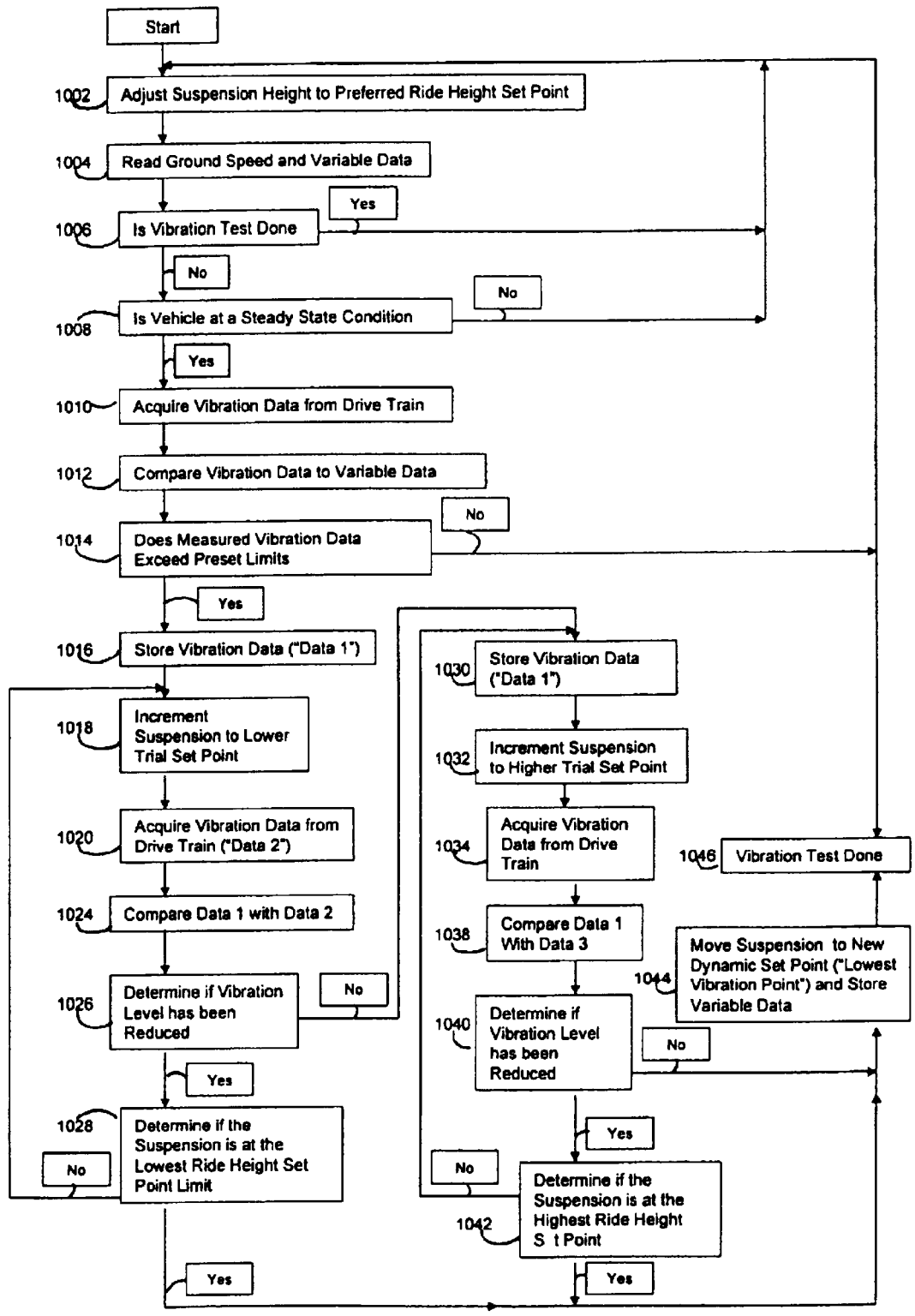
FIG. 4 is a flow chart illustrating an operation of the control system.

Referring to FIG. 4, a searching mode used to reduce and/or eliminate abnormal drive train vibration will now be described. Upon starting the operation, the suspension is adjusted so that ride height is set at a first ride height set point 1002. This first ride height set point may be set by the manufacturer or the control unit 20 itself, based on previously stored operating parameters, such as vehicle load and speed. In step 1004, the control unit 20 reads vehicle velocity, received from the vehicle communications bus 70 and other variable data or operating parameters including vehicle load (extrapolated from the pressure sensors 45 and 47). With this step, the control unit can determine if the vehicle is moving, and determine if it is necessary to perform a vibration test.

In step 1006, the control unit determines whether a vibration test was previously carried out at the ground speed and variable data detected in step 1004. If the vibration test was completed, the operation proceeds to step 1002 so that a vibration test is not repeated when in fact drive train vibration has already been corrected. If a vibration test was not completed, step 1008 is initiated to determine if the vehicle is in a steady state condition. For example the control unit 20 determines if the vehicle is at a relatively steady velocity (i.e., travelling between about 5 and about 75 miles per hour or in some other range or at some other specific speed). The control unit may also measure other parameters to determine whether a steady state is present, for example, acceleration, horsepower, torque, and rpms. The determination of a steady state condition is helpful because it ensures vibration is corrected under relatively constant conditions, such as cruising for 300 miles at 65 miles per hour, under which vibration may cause more damage than under instantaneous conditions, such as braking. If the vehicle is not in a steady state condition, then the step 1002 is begun again. If the vehicle is in a steady state condition, then the operation continues to step 1010 where vibration data is acquired from the sensor 60. Optionally, torque and/or vibration data may also be obtained from the bus 70 as desired.

In step 1012, the measured vibration data is compared to variable data. For example, the vibration measured in step 1010 and the variable data of vehicle load and velocity read in step 1004 are correlated to a stored ride height or range of ride height set-points, i.e., the ride height at which the vehicle should be set to reduce the measured vibration. This vibration data may be correlated to data in a table stored in the control unit.

In step 1014, the control unit 20 determines whether the measured vibration exceeds preset vibration limits. If it does not, then the control unit sets the ride height set point correlated in step 1012 and the operation proceeds to step 1046 where the vibration test is completed. If the vibration data exceeds the preset limits, then the operation proceeds to step 1016 where the vibration data is stored as "Data 1."

The control unit adjusts the valve module for the suspension to lower the ride height an incremental amount, for example ¼ inch, in step 1018. This is accomplished by the control unit operating the valve module 30 and deflating the suspension elements 40 and 42. In step 1020, the control unit acquires new vibration data from the drive train, referred to as "Data 2." Data 2 is compared to Data 1 in step 1024, and in step 1026, the control unit 20 determines if vibration level has been reduced. If yes in step 1026, then the control unit 20 determines if the suspension is at the lowest ride height set point limit, i.e., the lowest ride height set by the manufacturer, in step 1028. If not in step 1028, then the control unit returns to step 1018 to again lower the ride height, for example by another ¼ inch, and steps 1020, 1024, 2026 and 1028 are repeated. If yes in step 1028, then the suspension is moved to this new dynamic set point in step 1044, i.e., the ride height set point at which the lowest vibration detected occurs and that new dynamic step point is stored by the control unit along with the variable data measured in step 1004. The vibration test then is completed in step 1046.

If in step 1026, the control unit 20 determines that vibration level has not been reduced, then the operation continues to step 1030 where the vibration data is again stored as "Data 1." In step 1032, the suspension elements are adjusted by the control unit 20 to a higher ride height set point than the first ride height set point, for example ¼ inch above the first ride height set point. The control unit 20 then acquires vibration data from the sensor 60 in step 1034 and this new vibration data, "Data 3," is compared with Data 1 in step 1038.

In step 1040, the control unit 20 determines if the vibration level has been reduced. If the vibration level has not been reduced, then the operation proceeds to step 1044 and a new dynamic set point is set and stored and the test is completed in step 1046. If the vibration level has been reduced in step 1040, then the operation continues to step 1042 to determine if the suspension is at the highest ride height set point limit. If the suspension is not, then the operation returns to step 1030 to repeat steps 1030, 1032, 1034, 1036, 1038 and 1040. If, on the other hand, the suspension is at the highest ride height set point, then the operation proceeds to step 1044 as discussed above and the vibration test is completed in step 1046.

Certain steps recited above and depicted in FIG. 4 may be selectively omitted or substituted with other steps as desired to reduce the complexity and/or increase the efficiency of the process. Moreover, the above steps may be implemented to measure and reduce UTV or other operating parameters of the drive train system as desired.

IV. Alternative Control System Operation

The control system 10 of the present invention may also be used to reduce the ride profile of the semi-truck 100 to improve fuel economy. The module 70 measures the speed of the vehicle and/or the fuel economy and these measurements are communicated to the control unit 20. The control unit 23 adjusts the ride height $H_1$ of the semi-truck 100 to lower the vehicle thereby reducing the wind resistive profile of the semi-truck. As a result, fuel economy may be improved. Although not shown, the front axle may also be outfitted with suspension elements that are controlled by the control unit to lower the overall profile of the truck and improve the fuel economy. Preferably, the ride height is adjusted within acceptable parameters so that the alignment of the drive train, for example, the driveshaft angle a, is not adjusted to an extent that misaligns the drive train 80 and causes excessive vibration therein. The control system 20 may also monitor the vibration and/or torque in the drive train 80 to ensure that as the vehicle is lowered to improve fuel economy, the alignment of the drive train 80 is not adjusted to the extent that excessive vibration and/or torque results.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

What is claimed is:

1. A control system for a vehicle having a drive train comprising:
   a first sensor adapted to measure at least one of torque and vibration of a vehicle component;
   a valve module adapted to adjust a ride height of the vehicle, and thereby realign the drive train of the vehicle;
   a second sensor adapted to measure the ride height of the vehicle; and
   a control unit in communication with said first sensor, said second sensor and said valve module, wherein the control unit controls the valve module to realign the drive train based on the measured ride height and the at least one of the measured torque and vibration.

2. The control system of claim 1 wherein the control unit correlates the measured ride height to the measured at least one of torque and vibration.

3. The control system of claim 1 wherein the valve module adjusts a suspension element of the vehicle to adjust the ride height.

4. The control system of claim 3 comprising a pressure sensor adapted to sense pressure in the suspension element, wherein the control unit controls the valve module to adjust the ride height based on the sensed pressure.

5. The control system of claim 1 wherein the control unit causes the valve module to adjust the ride height until vibration is brought within predefined tolerances.

6. The control system of claim 1 wherein the first sensor measures vibration.

7. The control system of claim 6 wherein the first sensor measures at least one of vibration amplitude, vibration frequency and vibration impulse.

8. The control system of claim 1 wherein the control unit adjusts the ride height to reduce vibration.

9. The control system of claim 8 wherein the control unit stores the measured ride height as a preferred ride height when vibration is reduced.

10. The control system of claim 9 wherein the control unit correlates the preferred ride height to at least one of a load on the vehicle and a velocity of the vehicle.

11. A system for controlling drive train alignment in a vehicle having a ride height comprising:
   means for sensing at least one of vibration and torque in a vehicle component; and
   means for adjusting the ride height based on the sensed at least one of vibration and torque and for simultaneously realigning the drive train when the ride height is adjusted.

12. The system of claim 11 wherein the sensing means is a vibration sensor mounted on a vehicle component.

13. The system of claim 12 wherein the vehicle component is a transmission.

14. The system of claim 11 wherein the sensing means is a vehicle data communication bus.

15. The system of the claim 11 wherein the means for adjusting the ride height comprises:
   a valve module in fluid communication with an air suspension element; and
   a control unit in communication with the valve module wherein the control unit causes the valve module to adjust the air pressure in the air suspension element based on the sensed at least one of torque and vibration.

16. The system of claim 11 wherein the sensing means senses the at least one of vibration and torque substantially only when the vehicle is traveling at a constant rate.

17. The system of claim 11 wherein the drive train includes a driveshaft disposed at a driveshaft angle and wherein the adjustment of the ride height in response to the sensed at least one of torque and vibration adjusts the driveshaft angle.

18. A drive train system comprising:
   a transmission;
   an axle;
   a driveshaft connecting the transmission and the axle;
   a sensor adapted to measure vibration in at least one of the transmission, the axle and the driveshaft;
   a control that selectively adjusts alignment of at least one of the transmission, the axle and the driveshaft based on the measured vibration.

19. A process for controlling drive train alignment in a vehicle having a ride height comprising:
   sensing at least one of torque and vibration in a vehicle component;
   adjusting the ride height by at least one of increasing and decreasing the ride height based on the sensed at least one of vibration and torque, said adjusting of the ride height consequently causing the drive train alignment to be adjusted.

20. The process of claim 19 comprising adjusting the ride height to a first set-point.

21. The process of claim 20 comprising repeating the sensing and adjusting steps so that the ride height is adjusted to a second set-point.

22. The process of claim 21 comprising comparing the sensed at least one of torque and vibration at the first set-point to the sensed at least one of torque and vibration at the second set-point.

23. The process of claim 19 wherein vibration is sensed and wherein the sensed vibration is compared to a preferred vibration.

24. The process of claim 19 comprising storing the sensed at least one of torque and vibration.

25. The process of claim 19 wherein a speed of the vehicle is measured to determine if the speed is substantially constant.

26. A process for adjusting a vehicle drive train comprising:
   measuring vibration in the drive train;
   adjusting a ride height of the vehicle, by at least one of increasing and deceasing the ride height, based on said measuring to consequently adjust the alignment of the drive train and reduce the vibration.

* * * * *